United States Patent [19]

Suzuki et al.

[11] 4,011,727
[45] Mar. 15, 1977

[54] MOVABLE CABLE PLOW FOR CONSTRUCTING UNDERWATER CABLE

[75] Inventors: Kinya Suzuki; Kenji Mori, both of Tokyo; Yasuo Takeuchi; Yuzo Tokumaru, both of Yokohama; Kichizo Noji; Yutaka Okada, both of Tokyo, all of Japan

[73] Assignees: Nippon Telegraph and Telephone Public Corporation, Tokyo; Sumitomo Electric Industries, Ltd., Osaka; Sumitomo Heavy Industries, Ltd., Tokyo, all of Japan

[22] Filed: July 25, 1975

[21] Appl. No.: 599,230

[30] Foreign Application Priority Data

July 26, 1974 Japan .............................. 49-85108
July 26, 1974 Japan .............................. 49-85109

[52] U.S. Cl. .................. 61/72.4; 16/180; 37/54; 37/193; 61/72.6; 172/711
[51] Int. Cl.² ................ B63B 35/04; E02F 5/02; E02F 5/18
[58] Field of Search ............ 37/54, 71, 193, 98; 172/711, 699, 464, 483, 487, 474; 16/75, 180; 61/72.7, 72.6, 72.5, 72.4, 72.1; 267/154

[56] References Cited
UNITED STATES PATENTS

| | | | |
|---|---|---|---|
| 2,099,527 | 11/1937 | Lawton | 61/72.4 |
| 3,103,035 | 9/1963 | Magnuson | 16/180 |
| 3,395,545 | 8/1968 | Mendaloff, Jr. | 61/72.6 |
| 3,571,956 | 3/1971 | Heilberg | 37/98 |
| 3,585,804 | 6/1971 | Sramek | 61/72.6 |
| 3,724,108 | 4/1973 | Clayton | 37/193 |
| 3,898,852 | 8/1975 | Ezoe et al. | 61/72.6 |

FOREIGN PATENTS OR APPLICATIONS

| | | | |
|---|---|---|---|
| 1,362,152 | 4/1964 | France | 262/154 |
| 1,021,754 | 12/1957 | Germany | 16/75 |
| 250,242 | 8/1969 | U.S.S.R. | 61/72.6 |
| 1,062,250 | 3/1967 | United Kingdom | 61/72.4 |
| 840,513 | 7/1960 | United Kingdom | 37/193 |

*Primary Examiner*—Edgar S. Burr
*Assistant Examiner*—Steven A. Bratlie
*Attorney, Agent, or Firm*—Sughrue, Rothwell, Mion, Zinn & Macpeak

[57] ABSTRACT

A movable cable plow for dredging an underwater cable groove in a sea bed is disclosed wherein the plow is attached to a main body adapted to be pulled across the sea bed, such that it is adjustable vertically and angularly with respect to the main body. This allows the acurate control of the depth of the dredge groove. Also, a cable guide is pivotably attached to the plow, by way of a torsion spring hinge pin, so as to swing laterally with respect to the plow. This minimizes the lateral forces transmitted to the main body during the turning of the apparatus and, thereby, reduces the chances of the main body tipping over during the turning operation.

3 Claims, 8 Drawing Figures

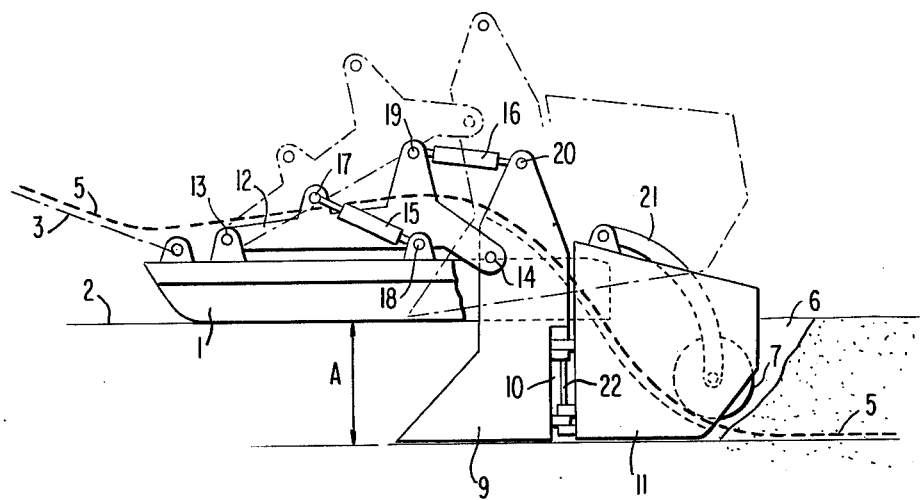
FIG.4
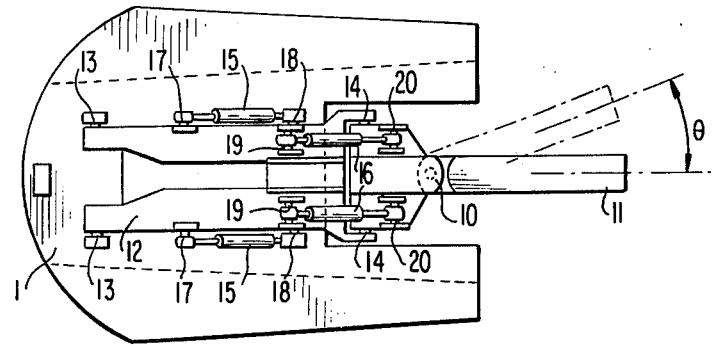
FIG.5
FIG.6
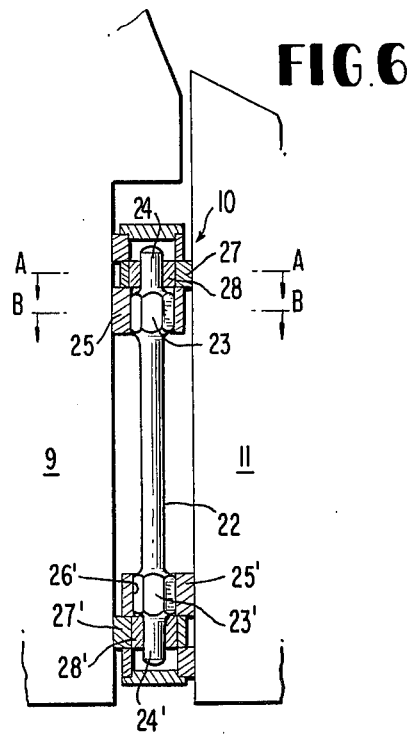
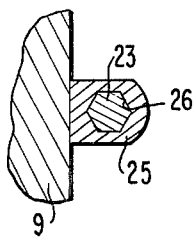
FIG.8
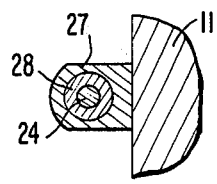
FIG.7

4,011,727

MOVABLE CABLE PLOW FOR CONSTRUCTING UNDERWATER CABLE

FIELD OF INVENTION

The present invention relates to means for depositing an underwater cable beneath the sea bed and, more particularly, to a movable plow for excavating a cable groove in the sea bed.

PRIOR ART

The conventional means of lying a cable underwater can be divided into two broad categories; (1) laying the cable directly onto the sea bottom which eventually allows the cable to be covered by mud or sand conveyed by the tide, and (2) burying the cable under the sea bottom artifically. The first way is, of course, simpler, but is often times ineffective insofar as the cable is likely to be unintentionally displaced by the action of the tide. The second method can be accomplished by removing the sand or mud by use of a water jet stream to provide the groove onto which the cable is layed, or removing the sand or mud by using a plow to form the cable groove.

The use of the plow has proven to be more convenient because it can provide quicker dredging and, accordingly, can perform the construction of a long underwater cable in a shorter period of time.

One form of conventional cable plow means utilizes a plow which is fixed to a main body which, in turn, is pulled across the sea bed by a work boat. The use of this type of cable plow means has required the measuring of the dredging resistance of the sea bed along the entire dredging route so as to ensure that the plow is of sufficient capacity to dredge the goove into the sea bed. If an unexpectly hard portion of sea bed was encountered the cable construction would be stopped, this incurring great loss of time and money. Furthermore, the fixed plow means has proven deficient insofar as its construction results in a large lateral force being applied to the main body during the turning of the same. This causes the main body to tip over during the turning operation of the plow.

Another type of conventional plow means incorporates a plow which is vertically adjustable with respect to the main body. This is accomplished by attaching the plow and cable guide assembly to the main body through a pivoting connection. Although this construction is an improvement over the rigid plow structure, it is deficient insofar the depth at which the cable is inserted into the formed groove becomes significantly less as the plow is raised vertically. The raising of the plow a small distance results in a raising of the cable a greater distance due to the geometry of the relationship between the cable guide means, the plow and the pivot attachment. Thus, when the plow is raised to overcome a hard spot in the sea bed, the depth at which the cable is buried becomes extremely small and often results in the uncovering of the cable due to the action of the tide.

SUMMARY OF THE INVENTION

The present invention avoids the foregoing problems by providing a novel cable plow means having improved lateral stability, and is vertically adjustable with respect to the main body. To increase the lateral stability and avoid the tipping over of the main body during turning of the apparatus, the present invention pivotably attaches the cable guide means to the rear of the plow so as to allow the cable guide means to pivot laterally with respect to the plow and thus minimize the transmission of lateral forces to a main body.

Also, the present invention allows the vertical adjustment of a plow with respect to the main body while at the same time preventing an undue raising of the cable depth as in the prior art apparatus. This is achieved by pivotably attaching the plow to a movable arm which, in turn, is pivotably attached to the main body. This allows the raising of the plow and cable guide assembly in a vertical direction without changing their angular orientation with respect to the main body.

BRIEF DESCRIPTION OF THE DRAWINGS

FIG. 4 shows a side view of the cable construction means according to the present invention;

FIG. 5 shows a plan view of the cable construction means of FIG. 4;

FIG. 6 shows a partial sectional detailed view of the hinge connecting the cable guide means to the plow according to the present invention;

FIG. 7 shows a sectional view taken along the lines A—A in FIG. 6; and

FIG. 8 shows a sectional view taken along the lines B—B of FIG. 6.

DETAILED DESCRIPTION OF THE PREFERRED EMBODIMENT

Figure 1:
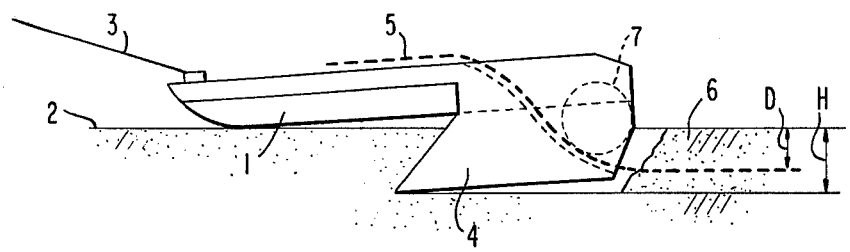
FIG. 1 shows a side view of a conventional underwater cabe construction means of the fixed plow type.
Figure 2:
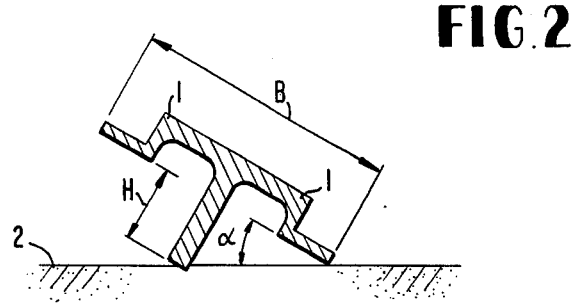
FIG. 2 shows a transverse cross sectional view of the fixed plow means of FIG. 1.

FIGS. 1 and 2 show conventional cable plow means having a fixed plow. In the drawings, number 1 designates the main body of the plow means which is adapted to slide along the sea bottom being towed by rope 3 attached to a work boat (not shown). A fixed plow 4 for making a cable groove 6 in which the cable 5 is to be buried is provided at the bottom of the main body 1. Numeral 7 designates the roller attached to the structure for pressing the cable 5 into the groove 6. The conventional plow has an elongated shape with a downwardly protruding triangular front portion and a rear portion which constitutes a cable guide means for forcing the cable downwardly into the groove formed by the plow. Thus, the length of the structure is quite long for the depth H at which the cable is to be buried, thereby resulting in difficulty in changing the direction in which the plow means is towed. The changing of direction results in extreme lateral forces being applied to the main body through the rigidly attached plow, and may result in the tipping over of the main body, as shown in FIG. 2. The body 1 is more likely to tip over as the angle $\alpha$ of the inclination gets larger. Therefore, in order to avoid this problem, the prior art plows have increased the breath B for a given depth D. This, however, leads to an unnecessarily large dimension of the main body 1.

Figure 3:
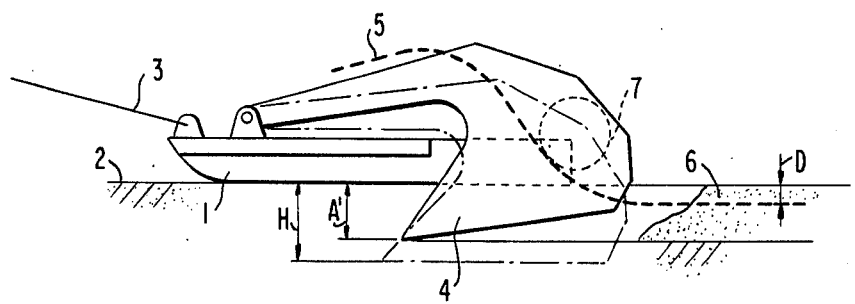
FIG. 3 shows a side view of a conventional underwater cable construction means of the movable plow type.

A second form of conventional plow for constructing an underwater cable, wherein the plow and cable guide means are pivotably attached to the main body, is shown in FIG. 3. There, the plow 4 and the cable pressing roller 7 are pivotally attached to the main body 1. As in the case of the rigid plow, main body 1 is adapted to the pulled over the sea bed 2 by cable 3 which is attached to a work boat (not shown). Typically, there are means, such as hydraulic cylinders, interposed between the main body 1 and the plow structure 4 so as to cause the plow structure 4 to pivot with respect to the main body thereby adjusting the depth of the groove 6. However, since the axis of the cable pressing roller 7 is located at a greater distance from the pivot point than the plow 4, the depths at which the cable is buried is raised a greater distance than the plow 4. Thus, if the plow is raised from the depth H of the depth A', the depth D at which the cable is buried becomes extremely small compared to the depth A'. Thus, it can be seen that if the plow is raised sa as to avoid an overload on the towing line 3, the cable 5 will only be buried to a minimal extent and will easily be uncovered by the action of the tide. Conversely, if the cable is buried to a sufficient depth D to avoid this uncovering, the plow 4 cannot be raised a sufficient height to avoid an overload on the line 3.

The present invention avoids these problems of a prior art devices by use of a structure which will be described in reference to FIGS. 4–8. FIG. 4 shows a side view of the cable plow according to the present invention wherein the main body 1 is adapted to be towed across the sea bed 2 by way of cable 3 attached to a work boat (not shown). The cable guide means 11 is attached to the rear of vertically adjustable plow 9 by way of hinge means 10. The plow 9 is secured to the movable arms 12 by way of pins 14 so as to be pivotable with respect thereto. The arms 12 which are y shaped are pivotably attached to the main body 1 at their forward ends by way of pins 13. Hydraulic cylinders 15 are secured to the forward ends of arm 12 by pins 17 and to the main body 1 by pins 18. Thus, it can be seen that extension and retraction of the hydraulic cylinders 15 causes the arms 12 to pivot horizontally about pins 13 with respect to main body 1.

A second pair of hydraulic cylinders 16 are secured to the upper fork of the rearward end of movable arm 12 by way of pins 19, and to the upper portion of plow 9 by way of pins 20. Plow 9 at a point lower than pin 20 is secured to the lower fork of the rearward end by pins 14. Thus, extension and retraction of hydraulic cylinders 16 cause the plow 9 to pivot with respect to the movable arms 12 about pins 14. This, it can be seen that the adjustment of the depth of groove 6 can be varied by extending or retracting cylinders 15 so as to raise the plow 9 with respect to the main body 1. At the same time, the depths at which the cable is buried is maintained equal to the depth of the plow by extending cylinders 16 so as to cause the plow 9 to pivot with respect to arms 12. This allows the plow 9 and the cable guide means 11 which comprises a vertical planar cable guide member to move substantially in vertical translation and does not change their angular orientation with respect to the main body as in the prior art movable plows shown in FIG. 3.

The number 7 designates a cable pressing roller which is secured to the upper portion of cable guides means 11 through supporting means 21. The cable 5 is supplied from the work boat (not shown) and is depressed or lowered into the groove 6 by the roller 7.

A torsion bar 22 is provided at the hinge means 10 and acts as a hinge pin and a means to bias the guide 11 to its neutral position in axial alignment with the plow means 9. Guide means 11 is allowed to swing laterally about the torsion bar 22 when the lateral forces acting thereof exceed the force exerted by the torsion bar 22.

FIG. 6 shows a detailed view of the hinge means 10 which connects the guide means 11 to the plow 9. As shown in that Figure, torsion bar 22 has an upper hexagonal portion 23 and a lower hexagonal portion 23' disposed adjacent the upper end portion 24 and the lower end portion 24', respectively. The upper hexagonal portion 23 engages a complimentary hexagonal bore 26 through tab 25 attached to plow 9. A detailed cross sectional view of this connection is shown in FIG. 8. The upper end portion 24 of the torsion bar 22 is rotatably supported in a bearing 28 provided in tab 27 which is attached to the cable guide means 11. The bearing 28 is coaxial with the hexagonal bore 26. The lower hexagonal portion 23' engages a complimentary hexagonal bore 26' provided through tab 25' attached to the cable guide means 11. The lower end portion 24' of the torsion bar 22 is rotatably supported by bearing 28' provided in tab 27' attached to the plow 9. Bearing 28' in coaxial with the hexagonal bore 26'. Thus, it can be seen that when any lateral force is applied to the cable guide means 11, the torsion bar 22 acts as a pivot pin to allow the relative lateral movement of the cable guide means 11 with respect to the plow 9. However, since one end of the torsion bar 22 is non-rotatably affixed to the plow 9, and the opposite end is non-rotatably affixed to the cable guide means 11, a lateral movement between these structures results in a twisting of the torsion bar 22. Upon removal of the lateral force from cable guide means 11, the twisted bar 22 exerts a force thereon so as to return the cable guide means to its neutral position, shown in FIG. 5. Although the preferred embodiment employs a torsion bar as the hinge pin, any construction which allows the cable guide 11 to be laterally pivoted with respect to the plow can be utilized with the invention.

In operation, the cable 5 is fed from the work boat and is guided into the groove 6 by cable guide means 11. As the main body 1 is towed along the sea bed 2, the movable plow 9 excavates to form the groove 6 of the desired depth into which the cable 5 is layed by roller 7.

When the plow encounters an obstacle in the sea bed, such as rocks or hard ground, the depth A (FIG. 4) is varied by raising or lowering the plow 9 by means of cylinders 15. At the same time, the cylinders 16 allow the plow and the cable guide means to maintain their angular orientation with respect to the sea bed. Needless to say, the cylinders 15 and 16 can be remotely controlled from the work boat.

The cable guide means 11 is connected to the plow 9 by way of hinge 10 and is biased to maintain its parallel position with respect to the plow 9, while at the same time it is capable of lateral movement to minimize the transmission of lateral forces to the main body 1. Thus, when the direction in which the plow is towed is changed to avoid an obstacle or hard ground, only the plow 9 is required to travel in the new direction since cable guide means 11 is pivotable laterally with respect thereto. Thus, the turning or changing of the direction can be accomplished more easily and with less danger of tipping over than the prior art plow devices.

This ease of the changing of direction of the plow means allows a less restricted selection of the cable route and reduces the ultimate required capacity of the towing boat. Thus, the plow according to the present invention has a wider field of use than the prior art devices, while at the same time resulting in a more stable apparatus than previously envisioned.

What we claim is:

1. Apparatus for dredging a groove in a sea bed for depositing an underwater cable in the groove, said apparatus comprising:
   a main body towable horizontally along a surface of the sea bed,
   a plow for dredging the groove in the sea bed,
   attachment means for attaching said plow to said main body such that said plow extends vertically with respect thereto,
   said attachment means comprising at least one Y-shaped arm,
   means for pivoting the non-forked end of said at least one arm to said main body for pivoting in the plane of the arm about a horizontal axis, so as to provide a vertically upper and lower fork for said arm at the rear end of said main body,
   means for pin connecting the lower fork to said plow intermediate of its ends, for pivoting said plow about a horizontal axis relative to said at least one arm,
   a first hydraulic cylinder pin connected at one end to said upper fork of said at least one arm and pin connected at the other end to said plow above the pin connection between said plow and said lower fork, and
   a second hydraulic cylinder secured at one end to said main body and at the other end to said at least one arm rearwardly of the pin connection of said at least one arm to said main body such that operation of said first hydraulic cylinder causes said plow to pivot relative to said at least one arm to vary the angle of attack of said plow with respect to said sea bed and operation of said second hydraulic cylinder causes said arm to pivot about its pin connection to pivot relative to said main body, whereby, said plow may be lifted vertically without change in orientation with respect to said sea bed during operation, and
   a planar cable guide member and torsion bar hinge means for mounting said planar guide member to the rear of said plow such that said guide member extends vertically and constitutes an extension of said plow and pivots about a vertical axis under the restraint of said torsion bar,
   whereby, when the direction in which the plow is towed is changed to avoid an obstacle or hard ground, only the plow is required to travel in the new direction with the cable guide member pivoting laterally with respect to the plow under the torsion bar restraint to minimize transmission of lateral forces to the main body to ease the change in direction of the plow and to minimize the danger of the plow tipping.

2. The apparatus as claimed in claim 1, wherein said torsion bar hinge means comprises a torsion bar having one end fixedly attached to said plow and an opposite and fixedly attached to said cable guide member such that when said cable guide member pivots with respect to said plow, the torsion bar is twisted about its longitudinal axis and exerts a force on said cable guide member tending to return it to a neutral position.

3. The apparatus as claimed in claim 2, wherein said torsion bar comprises a first hexagonal cross-sectional portion adjacent a first end and a second hexagonal cross-sectional portion adjacent the opposite end, a first tab attached to said plow has a hexagonal bore receiving the first hexagonal portion of said torsion bar, a second tab attached to said cable guide member has a second hexagonal bore receiving the second hexagonal portion of said torsion bar, a third tab attached to said cable guide member has a smooth bore rotatably receiving the first end of said torsion bar, and a fourth tab attached to said plow has a smooth bore rotatably receiving the second end of said torsion bar.

* * * * *